Dec. 19, 1944.  C. S. HAZARD  2,365,192
CUTOFF DEVICE FOR CONTROLLING THE BULK SUPPLY
OF LIQUID DISPENSING APPARATUS
Filed April 8, 1940  3 Sheets-Sheet 1
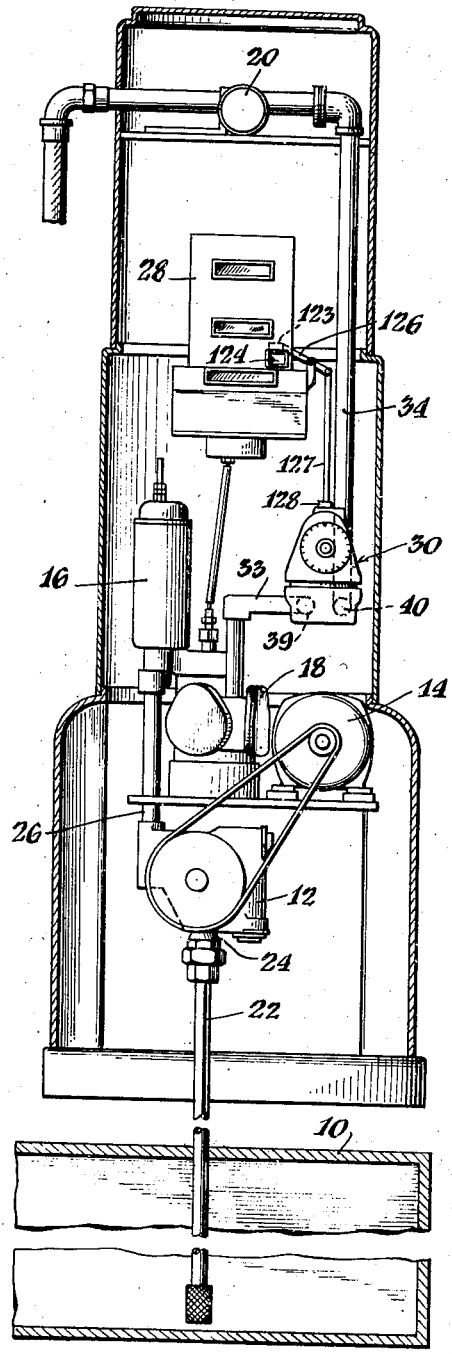
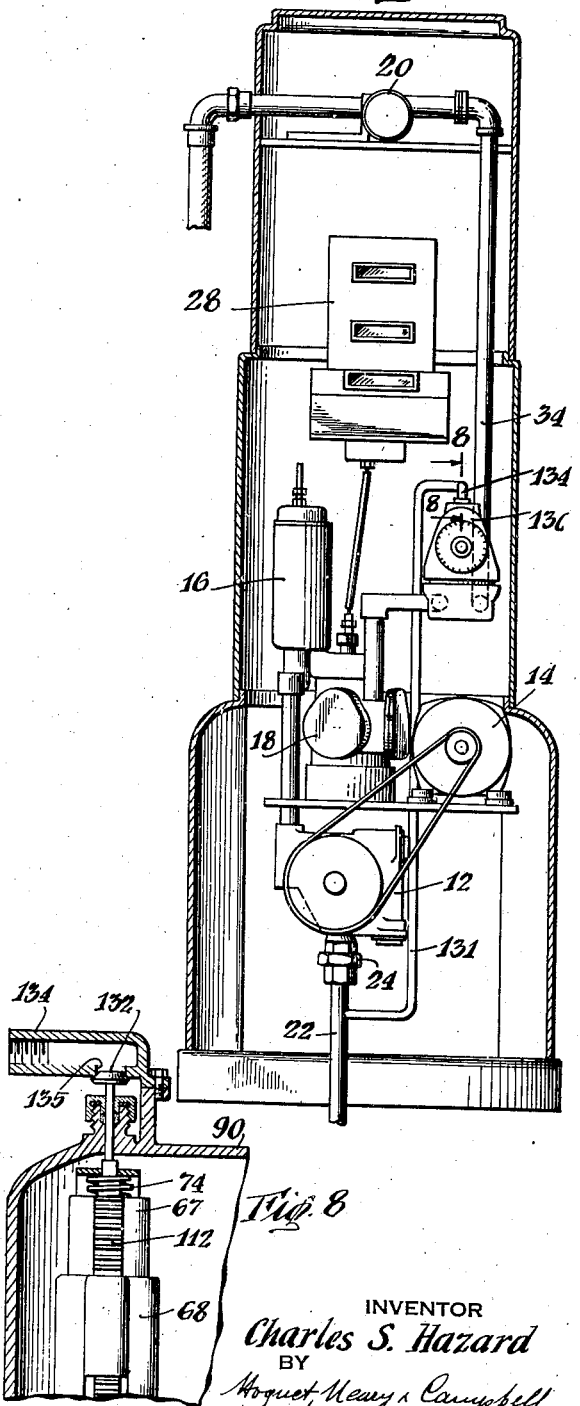
INVENTOR
Charles S. Hazard
BY
Hoguet, Neary & Campbell
ATTORNEYS Dec. 19, 1944.  C. S. HAZARD  2,365,192
CUTOFF DEVICE FOR CONTROLLING THE BULK SUPPLY
OF LIQUID DISPENSING APPARATUS
Filed April 8, 1940   3 Sheets-Sheet 2
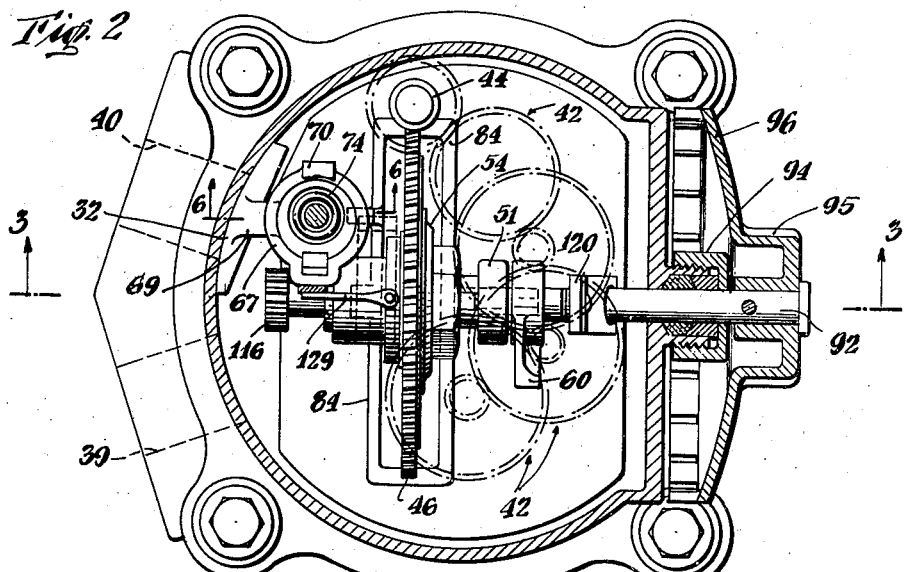
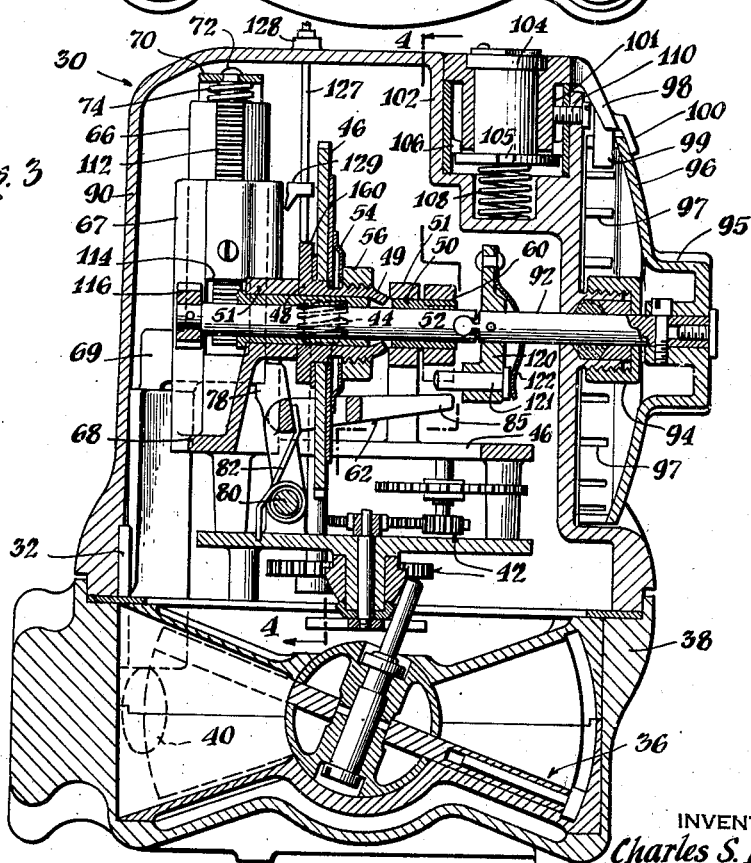
INVENTOR
*Charles S. Hazard*
BY
*Hoguet, Neary & Campbell*
ATTORNEYS Dec. 19, 1944.  C. S. HAZARD  2,365,192
CUTOFF DEVICE FOR CONTROLLING THE BULK SUPPLY
OF LIQUID DISPENSING APPARATUS
Filed April 8, 1940  3 Sheets-Sheet 3
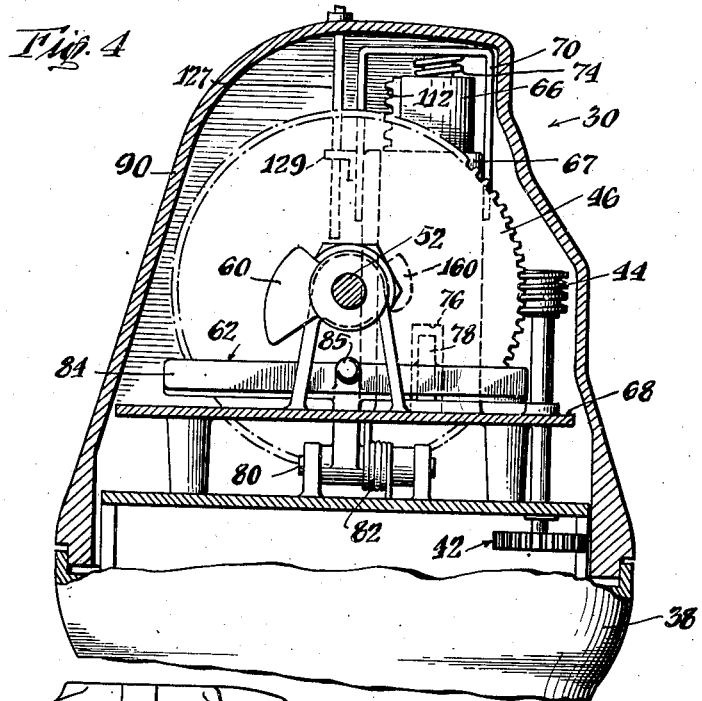
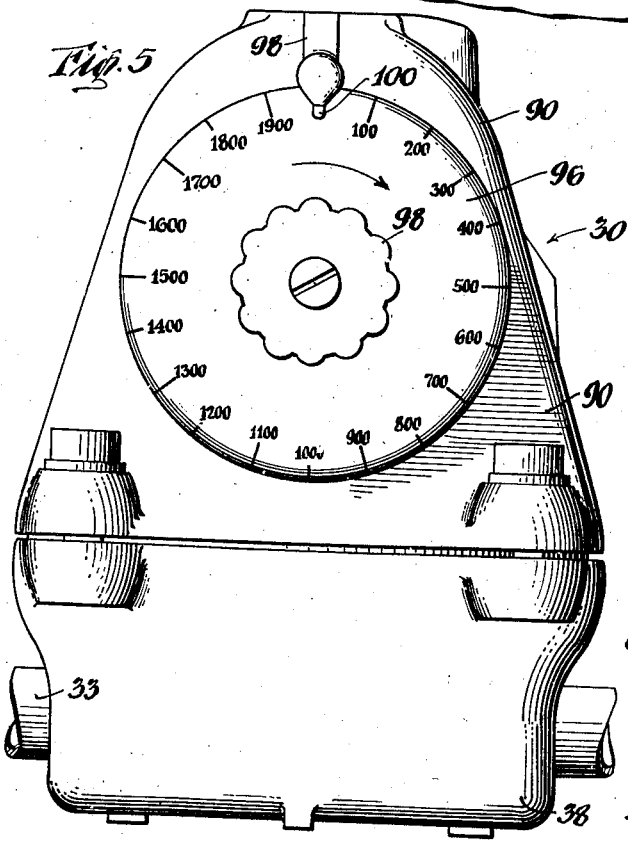
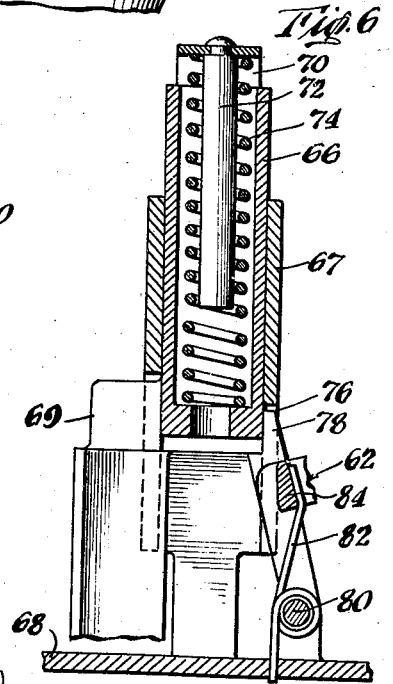
INVENTOR
Charles S. Hazard
BY
Arquet, Meary & Campbell
ATTORNEYS Patented Dec. 19, 1944

2,365,192

UNITED STATES PATENT OFFICE 2,365,192

CUTOFF DEVICE FOR CONTROLLING THE BULK SUPPLY OF LIQUID DISPENSING APPARATUS

Charles S. Hazard, Andover, N. J., assignor to Neptune Meter Company, a corporation of New Jersey Application April 8, 1940, Serial No. 328,448

4 Claims. (Cl. 222—20)

This invention relates to liquid dispensing apparatus and more particularly to a cut-off device for controlling the bulk supply of liquid for liquid dispensing apparatus.

In the wholesale distribution of liquid fuel, such as gasoline, to automobile service stations or like retail establishments, it has been, in many instances, the practice of retailers to order quantities of liquid much smaller than the capacity of the bulk supply tanks of their liquid dispensing apparatus. For example, a retailer may have a bulk supply tank having a capacity of 1500 or 2000 gallons, but instead of purchasing sufficient fuel to completely fill the tank, he may only order two, three or four hundred gallons at a time. This is frequently due to lack of credit or low working capital. The buying of small quantities by these retailers usually makes it necessary for the wholesale distributor to send a heavy tank wagon to deliver each small order, thereby, in many instances, involving an aggregate expense of five to as many as ten trips to deliver an amount of liquid fuel which otherwise could have been delivered by a single trip. This practice on the part of a large number of retail distributors has added materially to the expense of wholesale distribution.

It is therefore an object of the present invention to provide means enabling the wholesaler to reduce the cost of wholesale distribution of liquid fuel to retail distributors who make a practice of ordering liquid fuel in amounts considerably smaller than the capacity of the bulk supply tanks with which their liquid dispensing apparatus are provided.

Another object of the invention is to provide means for placing the capacity of the bulk supply tanks of retail dispensing apparatus under control of the wholesale distributor or his authorized agents so that the tanks may be completely filled and the amounts withdrawn limited by the wholesaler or his agents in accordance with the extent of credit allowed the retailer or the amount paid in advance.

A further object of the invention comprises the provision of a form of cut-off or delivery disabling device for controlling the bulk supply to retail dispensing pumps or other dispensing apparatus which is capable of being reset only by those having proper authority.

A still further object of the invention is the provision of an indicator or signal device in combination with the cut-off device to forewarn the retailer when nearly all of the amount of liquid arranged for has been delivered.

The above and other objects of the invention may be accomplished by providing the usual retail dispensing apparatus with means adapted to be preset by the wholesale distributor or his authorized agent to permit the withdrawal of only the amount of liquid from the bulk supply tank which has been bargained or paid for by the retailer. The wholesaler may then completely fill the bulk supply tank and thereby materially reduce the number of tank wagon trips heretofore required.

The invention includes, in association with a liquid dispensing apparatus of one of the conventional types, a bulk delivery control mechanism comprising a cut-off device interposed in or otherwise operatively associated with a liquid supply line for the liquid dispensing apparatus. The control mechanism also includes or is associated with a registering or metering device adapted to cause actuation of the cut-off device and thereby prevent flow of liquid from the bulk supply to and through the dispensing apparatus when a predetermined quantity of liquid has been delivered. The bulk delivery control mechanism is so arranged in reference to the conventional elements of the dispensing apparatus as to permit the predetermined quantity of liquid to be dispensed in the usual retail amounts, and the resetting of the usual cost and volume registers after each retail sale does not in any way interfere with the progressive registering or metering operation that is performed by the bulk delivery control. The bulk delivery control mechanism is adapted for construction as a unit for use in controlling bulk supply in various dispensing or delivery systems where delivery of predetermined quantities must be maintained under control of certain authorized persons.

The cut-off feature of the bulk control mechanism may take any of various forms. For example, it may consist of flow control means, such as a cut-off valve, a suction disabling means for the pump, a valve controlled by-pass between the discharge and suction sides of the pump or other control means whereby the delivery of liquid from the bulk supply tank can be discontinued upon the withdrawal of a predetermined amount for which the retailer has bargained.

In order to maintain the cut-off device under the control of the wholesale distributor, the device may be provided with means adapted to be manipulated only by a person properly authorized, whereby the flow control means may be reset and the registering or predetermining means set to provide for a further delivery of liquid.

The device may also be provided with indicating means to indicate the predetermined amount for which the device is set together with means for locking the device at a desired setting. To forewarn the retailer when the amount bargained for has nearly all been delivered, a form of indicator may be provided to furnish a visual or audible signal when a certain predetermined portion still remains capable of being dispensed before cut-off of further delivery will take place.

The hereinbefore mentioned and additional objects of the invention will become further apparent upon consideration of the following detailed description, when considered in connection with the accompanying drawings, in which:

Figure 1 is a view in sectional elevation of a retail dispensing apparatus provided with one form of cut-off device of the present invention;

Figure 2 is a plan view of the cut-off device with the housing in section to show the mechanism contained therein;

Figure 3 is a view in vertical section taken substantially along line 3—3 of Figure 2;

Figure 4 is a view in vertical section taken substantially along line 4—4 of Figure 3;

Figure 5 is a view in elevation of the cut-off device showing the manual setting knob and indicator dial;

Figure 6 is a view in vertical section of the valve operating and latching mechanism taken substantially along line 6—6 of Figure 2;

Figure 7 is a view in sectional elevation of a retail dispensing apparatus provided with a modified form of bulk supply control means, and Figure 8 is a view in vertical section taken substantially along line 8—8 of Figure 7.

Referring to Figs. 1 to 6 of the drawings, one form of the invention is shown illustrated in combination with certain essential elements of the usual retail dispensing apparatus now commonly provided in service stations for supplying liquid fuel propelled vehicles. As shown in Fig. 1 the retail dispensing apparatus comprises a bulk supply tank 10 usually located underground, a pump 12, a motor 14, an air separator 16, a meter 18, and a liquid flow indicator 20. A conduit 22 is normally provided connecting the bulk supply tank to the inlet side 24 of the pump 12. The discharge or pressure side of the pump 26 is shown as connected to an air separator 16 whereby air and vapor may be separated from the liquid fuel before passage of the liquid to the meter 18. The meter 18 may be operatively connected to any suitable computing register 28 capable of indicating the cost, amount and price of the liquid dispensed.

In order to provide accurate control of the withdrawal of liquid from the bulk supply tank 10, the flow control device 30 is advantageously located on the pressure side of the pump 12, preferably between the discharge side of the air separator 16 and the flow indicator 20, as shown in Figure 1. The flow control device 30 may comprise any one of several different forms of means for controlling the delivery of liquid from the bulk supply tank 10. As shown in Figs. 2 and 3, the control device 30 is provided with a cut-off valve 32 to prevent the delivery of liquid through the meter 18 and the discharge conduit 34.

More particularly, the form of flow control device is provided with a hydraulic motor 36 of the metering type connected in the system between the meter 18 and the discharge conduit 34. The hydraulic motor 36 is provided with a housing 38 having an inlet connection 39 and an outlet connection 40 (Figs. 1 and 2), the inlet connection being connected to the conduit 33 and the outlet connection being connected to the discharge conduit 34. While the cut-off valve 32 is shown in Figs. 2 and 3, to be associated with the outlet connection 40, it will be understood that it may be associated at other points in the system or provided in various by-pass or suction disabling arrangements for controlling the delivery of liquid through the meter 18.

The mechanism for controlling the operation of the cut-off valve as viewed in Figs. 2 to 4, comprises a reduction gear drive 42 through which movement corresponding to the flow of liquid is transmitted from the hydraulic motor 36 to a worm 44 which drives a worm gear 46. The worm gear 46 is rotatably mounted upon a collar 48 which is keyed at 49 to a sleeve 50 supported in bearings 51 and through which a shaft 52 is slidably mounted. The worm gear 46 is operatively connected by a suitable friction clutch 54 to the collar 48 by a nut 56 threadably received on the collar 48. The sleeve 50 carries a cam 60 (Figs. 2, 3 and 4) which is adapted to be preset to actuate a valve tripping lever 62 for cut-off purposes after the delivery of a predetermined amount of liquid.

Referring to Figures 2, 3, 4 and 6 of the drawings, the valve 32 is shown to be arcuately shaped to fit the inner surface of the housing 38 to adequately control the discharge connection 40. The reciprocation of the valve is controlled by a spring biased sleeve 66 slidably received in a hub 67 suitably supported in the frame structure 68. The valve 32 is connected to the sleeve 66 by an arm 69, as best shown in Figures 2, 3 and 6. Mounted on the hub 67 and extending in spaced relation above the end of the hub is a bracket 70 which supports a stem 72 about which a spring 74 is retained to bias the valve sleeve 66 in a downward direction. The hub 67 is provided at 76 with an opening through which an arm 78 of the tripping lever 62 is adapted to extend and latch the valve sleeve 66 in open position, as indicated in Figure 6. The tripping lever 62 is in the general form of a bellcrank pivoted at 80 and biased by a spring 82 toward latching position. The tripping lever in plan view (Fig. 2) comprises a rectangular section 84 which is adapted to surround the lower portion of the worm gear 46. An extension 85 is provided on the rectangular portion 84 which is spaced from the sleeve 50 in the path of movement of the cam 60.

The cam 60 may be preset to operate the valve after a predetermined operation of the hydraulic motor 36, that is, after a predetermined amount of liquid has been withdrawn from the bulk supply tank. The cam being preset will register a movement until the predetermined amount of liquid has been delivered, and then by depressing the extension 85 of the tripping lever 62, move the arm 78 clockwise, as viewed in Fig. 3, to release the valve sleeve 66. The valve sleeve being released, permits the spring 74 to force the valve 32 across the outlet connection 40 to prevent further delivery of liquid.

The valve 32 and the cam 60 of the cut-off device may only be preset by those having proper authorization. For example, the valve 32, the tripping lever 62 and the means for resetting the valve and presetting the cam 60 are all enclosed within a casing 90 (Figs. 2 and 3). The shaft 52 is provided with an extension 92, which extends outwardly of the casing through a suitable bearing and stuffing box 94, to a manually actuatable knob 95. A peripheral dial 96 appropriately marked to indicate the amounts for which the cut-off device may be preset is associated with the knob 95. The periphery of the dial 96 is provided with slots 97 which are adapted to cooperate with a locking member 98 which includes a lug 99 adapted to extend through a selected slot 97. The locking member 98 is also provided with an index pointer 100 which is adapted to overlap the edge of the dial to aid in the locking thereof and to indicate the setting of the cam 60. The locking member 98 includes a sleeve 101 which is receivable within a boss 102 of the casing 90. The sleeve 101 is adapted to be locked within the boss 102 by a key controlled barrel 104 which when operated by the proper key may be turned to bring recesses 105 in alignment with locking lugs 106. The boss 102 may be provided with a spring 108 to aid in the unlocking and releasing movement of the member 98, a stop 110 being provided to prevent the complete removal of the locking member 98 from the boss 102.

For the purpose of resetting the valve when further withdrawal of liquid has been agreed upon between the retailer and the wholesaler, a reset connection is provided for operation by the knob 95. As shown in Figure 3, the sleeve 66 is provided with rack teeth 112 which are exposed through an opening 114 in the hub 67. A pinion 116 is carried by the shaft 52 and when the shaft is moved to the right, as viewed in Figure 3, the pinion is brought into meshing engagement with the rack 112. When the locking member 98 has been unlocked to release the dial portion 96, the knob 95 may be slightly turned to remove the cam 60 from valve tripping position and then pulled outwardly of the casing 90 to bring the pinion 116 into meshing engagement with the rack 112. By rotating the knob 95 the pinion may be operated to lift the valve 92 to an open position permitting the latch arm 78 to engage the lower end of a sleeve 66. After resetting the valve 32, the cam 60 may be reset to permit a predetermined amount of liquid to be withdrawn from the bulk supply tank before the valve 32 will again be released to cut off the flow through the discharge conduit 34.

In order to provide for the resetting of the cam 60, an arm 120 (Fig. 3) is mounted on the shaft extension 92. The arm 120 is provided with a pin 121 which is biased toward cam engaging position by a spring 122. When the knob 95 is pulled outwardly of the casing to reset the valve, the pin 122 will be retracted to a position free of the cam 60. After the resetting of the valve, the knob 95 must be moved toward the casing to disengage the pinion 116 from the rack 112 before the cam 60 can be properly reset. Should the pin 121 be in alignment with the cam 60 during the disengaging movement of the pinion 116, the spring 122 will permit the pin 121 to retract, permitting the shifting of the shaft to complete the disengagement of the pinion. By rotating the knob 95, the pin 121 may be caused to return to operative position adjacent the cam 60. In this position the knob 95 may be again rotated clockwise, as viewed in Figure 5, to preset the cam to a desired position for actuation of the tripping lever 62. The clockwise movement of the dial 96 is discontinued when the predetermined amount of liquid to be delivered is indicated at the index 100. During liquid delivery the cam 60 will continue to move in a clockwise direction until it has registered a movement corresponding to the predetermined amount for which the device is set. When it has reached a registering position corresponding to the amount indicated on the dial, the cam is adapted to effect the tripping of the valve sleeve 66 so that the valve 32 may close and prevent further delivery of liquid.

In order to forewarn the retailer when nearly all of the amount for which the cut-off device has been preset has been delivered, means may be provided to furnish a visual or audible signal. In Figures 1 to 4 of the drawings, a form of visual indicator element 123 has been illustrated adjacent the dials of the computer 28 for that purpose. To render the element 123 readily observable, the element may be brightly colored and arranged for movement into view at a window 124 shortly before the cut-off device is adapted to be actuated. The operator of the pump will then know that the liquid supply will soon be cut off, say, after the further delivery of a few gallons of liquid. The attendant being thus forewarned may make arrangements for the authorized resetting of the cut-off device prior to operation thereof.

The means for actuating the indicator 123 comprises a pivoted arm 126 to which a connecting rod 127 is pivoted and extended through a stuffing box 128 into the casing 90 of the cut-off device. The lower end of the rod 127 is guided by a bracket 129 supported on the hub 67. Carried by the collar 48 is a cam 160 which is so arranged with respect to the cam 60 as to lift the rod 127 prior to the actuation of the valve tripping lever 62. The lifting movement of the rod 127 is adapted to move the indicator 123 across the window 124 to indicate to the retailer or his attendant that the amount of liquid bargained for has nearly all been delivered and that the cut-off device will be actuated upon the withdrawal of an additional determined amount of liquid. When the cut-off device is reset, causing the cam 160 to be moved from beneath the rod 127, the indicator 123 will be returned to a non-signalling position by the weight of the rod 127. If the arrangement should be such that the weight of the rod 127 is insufficient to effect the return of the indicator, a suitable spring or weight might be added to normally bias the indicator to non-signalling position.

While a form of cut-off valve has been shown in Figures 1 to 6 associated with the discharge side of the pump, it will be apparent that the invention can be accomplished by other forms and arrangements as well. For purposes of further illustration, a second form of the invention is shown in Figures 7 and 8. The elements of the dispensing apparatus in this form are the same as illustrated in Figure 1. A modified form of flow control device 130 is provided which is adapted to disable the suction effect of the pump 12 after the flow control device has operated in response to the delivery of the predetermined amount for which the device has been set. The suction disabling of the pump 12 is accomplished by providing an atmospheric connection 134 to the conduit 22 on the inlet side 24 of the pump. The atmospheric connection which includes the conduit 131 is controlled by a suitably arranged valve 132. The entire mechanism of the flow control device may be the same as disclosed in connection with the device 30 except that an atmospheric control valve 132 is substituted for the cut-off valve 32.

As shown in Figures 7 and 8, the conduit 131 leads from the suction side 24 of the pump 12 to the atmospheric connection 134, which is provided with a valve seat 135 for cooperation with the valve 132. When the valve 132 is in closed position, the suction effect of the pump is maintained to permit the withdrawal of liquid from the supply tank for dispensing purposes. When the flow control device 130 operates upon the withdrawal of a predetermined amount of liquid for which the device is preset, the valve 132 will be tripped open thereby establishing atmospheric communication to the inlet side of the pump. This disables the suction effect of the pump so that further delivery of liquid from the supply tank is prevented until the wholesale distributor or his agent resets the device 130 for an additional predetermined amount. This form may also be provided with a signal device similar to the indicator 123 or of other form and arrangement, if desired.

It will be apparent from the foregoing description that the present invention materially reduces the number of tank wagon trips heretofore required to supply the bulk supply tanks of the dispensing apparatus of retail service operators who consistently order small quantities of fuel. Instead of sending a heavy tank wagon in response to each small order, the wholesale distributor may with the installation of my invention, completely fill the bulk supply tank and set the cut-off device to effect delivery of only the amount of fuel to the extent for which the retailer has bargained. When additional amounts are ordered, the wholesale distributor or his authorized agent in the vicinity of the retail establishment may reset the device to permit further withdrawal of liquid from the bulk supply tank without requiring expensive trips with the heavy tank wagons until the bulk supply tank is nearly empty.

While I have shown and described certain different forms of my invention, I am fully aware that many additional forms are possible without departing from the spirit of the invention. For this reason it should be understood that the forms of the invention herein illustrated and described are intended to be illustrative of the invention only and not as limiting the scope of the appended claims.

I claim:

1. In apparatus for retailing liquid, a bulk supply tank, a pump for effecting delivery of liquid from said supply tank, a hydraulic motor located on the discharge side of said pump and driven by the liquid delivered thereby, presettable means including a cam surface adapted to be driven from an initial position by said motor to register a movement corresponding to the aggregate amount of liquid withdrawn from said tank for a plurality of dispensing operations, a conduit connected to the inlet side of the pump, a valve controlling communication of the conduit with the atmosphere, and means operatively associated with the cam surface to effect the opening of said valve when an amount of liquid predetermined by the initial setting of the cam surface has been withdrawn from the tank.

2. In liquid dispensing apparatus of the character described, a bulk supply tank, a pump, a suction pipe extending from the pump to the tank, a vent connection for the suction pipe, a valve to control the vent connection, a hydraulic motor driven by liquid delivered by said pump, presettable means adapted to be driven by the motor an amount corresponding to the aggregate amount of the liquid withdrawn from said tank during a plurality of dispensing operations, and means controlled by said presettable means to automatically open said valve when an amount of liquid has been withdrawn for which said presettable means were set.

3. In liquid dispensing apparatus of the character described, a bulk supply tank, a pump, a suction pipe extending from the pump to the tank, a vent connection for the suction pipe, a valve to control the vent connection, a hydraulic motor driven by liquid delivered by said pump, presettable means adapted to be driven by the motor an amount corresponding to the aggregate amount of the liquid withdrawn from said tank during a plurality of dispensing operations, a signal device, means controlled by said presettable means to open said valve when a predetermined amount of liquid has been delivered, which predetermined amount is determined by the setting of said presettable means, and to actuate said signal device in predetermined advanced relation to the opening of said valve.

4. In liquid dispensing apparatus of the character described, a bulk supply tank, a pump, a suction pipe extending from the pump to the tank, a vent connection for the suction pipe, a valve to control the vent connection, a hydraulic motor driven by liquid delivered by said pump, presettable means adapted to be driven by the motor an amount corresponding to the aggregate amount of the liquid withdrawn from said tank during a plurality of dispensing operations, said presettable means having an indicator presettable to indicate a predetermined amount of liquid that can be withdrawn, a lock for said presettable means to prevent unauthorized change in the setting of said indicator, and means controlled by said presettable means to automatically open said valve when an amount of liquid has been withdrawn for which said presettable means were set.

CHARLES S. HAZARD.